United States Patent [19]
Fujita

[11] Patent Number: 5,886,964
[45] Date of Patent: *Mar. 23, 1999

[54] OPTICAL HEAD TRACKING ERROR DETECTION DEVICE

[75] Inventor: Teruo Fujita, Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 706,562

[22] Filed: Sep. 5, 1996

[30] Foreign Application Priority Data

Sep. 8, 1995 [JP] Japan ................................ 7-231424

[51] Int. Cl.⁶ .................................................. G11B 7/09
[52] U.S. Cl. ................................ 369/44.37; 369/44.41; 369/110; 369/112
[58] Field of Search .............................. 369/44.37, 44.38, 369/44.41, 44.23, 44.26, 112, 110, 13, 121

[56] References Cited

U.S. PATENT DOCUMENTS

| | | |
|---|---|---|
| 5,329,517 | 7/1994 | Yamaguchi et al. . |
| 5,373,500 | 12/1994 | Tinet . |
| 5,519,685 | 5/1996 | Kato et al. .............................. 369/110 |

FOREIGN PATENT DOCUMENTS

| | | |
|---|---|---|
| 0201603 | 11/1986 | European Pat. Off. . |
| 0579843 | 1/1994 | European Pat. Off. . |
| 0597202 | 5/1994 | European Pat. Off. . |
| 2306495 | 10/1976 | France . |
| 41412 | 1/1992 | Japan . |
| 434212 | 6/1992 | Japan . |
| 1548658 | 7/1979 | United Kingdom . |
| 9008381 | 7/1990 | WIPO . |

OTHER PUBLICATIONS

G. Bouwhuis et al., *Principles of Optical Disc System*, Adam Hilger, pp. 72–73 (1985).

*Primary Examiner*—Thang V. Tran

[57] ABSTRACT

To achieve a tracking error detection, a device for use in a simple optical system is disclosed which reduces offset resulting from the lateral movement of an objective lens or a tilt of an information recording medium. The disclosed device maintains the maximum amplitude of a tracking error signal irrespective of variations in track pitch of the information recording medium. The device produces a light beam having substantially-half portions about 180 degrees out of phase with each other, and another light beam which are directed and focused via an objective lens to an information recording medium. The light spots formed by the two light beams are disposed on the information recording medium with a spacing of substantially an integral multiple of the track pitch in the direction perpendicular to the tracks on the information recording medium. Each light beam returning from the information recording medium is received by a pair of split photodetectors, and a tracking error signal is obtained from the difference between the differential outputs.

16 Claims, 9 Drawing Sheets

OPTICAL HEAD TRACKING ERROR DETECTION DEVICE

BACKGROUND OF THE INVENTION

The present invention relates to a a device for detecting an tracking error of an optical head for optically recording and reproducing information, and particularly a tracking error detection device which produces little offset and in which the detection sensitivity has little dependence on the tracking pitch.

Figure 8:
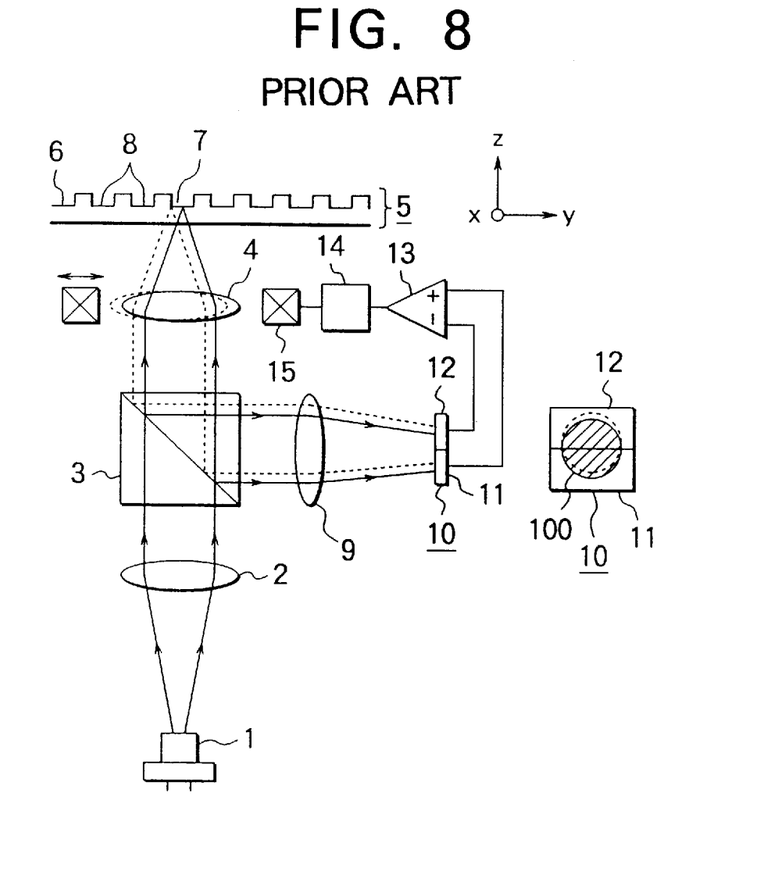
FIG. 8 is a schematic representation of the configuration of a conventional tracking error detection device.

FIG. 8 shows the configuration of a conventional tracking error detection device using a push-pull method, shown in Japanese Patent Kokoku Publication No. 1412/1992 and "G. Bouwhuis et al., Principles of Optical Disc System, Adam Hilger, pp.72 to 73 (1985)." In the figure, reference numeral 1 denotes a light source such as a semiconductor laser, which emits a light beam for recording and reproduction. Reference numeral 2 denotes a collimator lens for converting the light beam from the light source 1 into a parallel beam. Reference numeral 3 denotes a beam splitter which passes the parallel beam from the collimator lens 2 and reflects the beam reflected at an information recording medium 5, which will be described later. Reference numeral 4 denotes an objective lens which focuses the light beam emitted from said light source 1 onto the information recording surface 6 of the information recording medium 5, such as an optical disk, and converts the beam reflected by the information recording medium 5 into a parallel beam. Reference numeral 7 denotes a light spot formed on the information recording surface 6 of the information recording medium 5. Reference numeral 8 denotes a track, which is parallel to the x direction, as shown in the figure. The y direction is perpendicular to the track 8 and is in a plane parallel to the information recording medium 5. The z direction is perpendicular to the information recording surface 6. Reference numeral 9 is a converging lens for concentrating a reflected beam in a suitable area on a split photodetector 10. The split photodetector has two light-receiving faces 11 and 12. Reference numeral 100 denotes a light spot on the split photodetector 10. The differential amplifier 13 produces a difference between the outputs from the light-receiving faces 11 and 12 as a tracking error signal TES. The tracking error signal TES is supplied via the phase-compensation circuit/amplifier 14 to the objective lens driving mechanism 15.

The operation of the conventional tracking error detection device shown in FIG. 8 will next be described. The light spot 100 on the split photodetector 10 is circular as shown in FIG. 8. The split photodetector 10 is disposed so that the boundary between the light-receiving faces 11 and 12 divides the circular spot into upper and lower halves. When the light spot 7 travels along the track 8 at its center, the amount of light received by the light-receiving face 11 equals to the amount of light received by the light-receiving face 12. When the light spot 7 deviates from the center of the track 8, the amount of light received at the light-receiving face 11 is different from the amount of light received at the light-receiving face 12. The direction (right or left) in which the light spot 7 deviates from the center of the track 8 determines whether the difference in amount of received light between the light-receiving faces 11 and 12 is positive or negative. Consequently, the difference in output between the light-receiving faces 11 and 12 can be treated as a tracking error signal.

The lateral movement of the objective lens 4 to the position indicated by a dotted line causes the lateral movement of the light spot 100 to the position indicated by a dotted line on the split photodetector 10, as shown in FIG. 8. Consequently, the light-receiving faces 11 and 12 receive different amounts of amount of light even if the light spot 7 is at the center of the track 8.

When the information recording medium 5 tilts relative to the y direction, the light spot 100 on the split photodetector 10 deviates. Consequently, the light-receiving faces 11 and 12 receive different amounts of light even if the light spot 7 is at the center of the track 8.

As a solution to these problems, Japanese Patent Kokoku Publication No. 34212/1992 describes a method in which two light spots are disposed on an information recording medium, with a spacing of about a half of the track pitch; the beams returning from the two light spots are received by respective two split photodetectors; and the difference between the differential outputs of the two split photodetectors is treated as a tracking error signal. The configuration, operation, and problems of this method will next be described, with reference to FIGS. 9 and 10.

Figure 9:
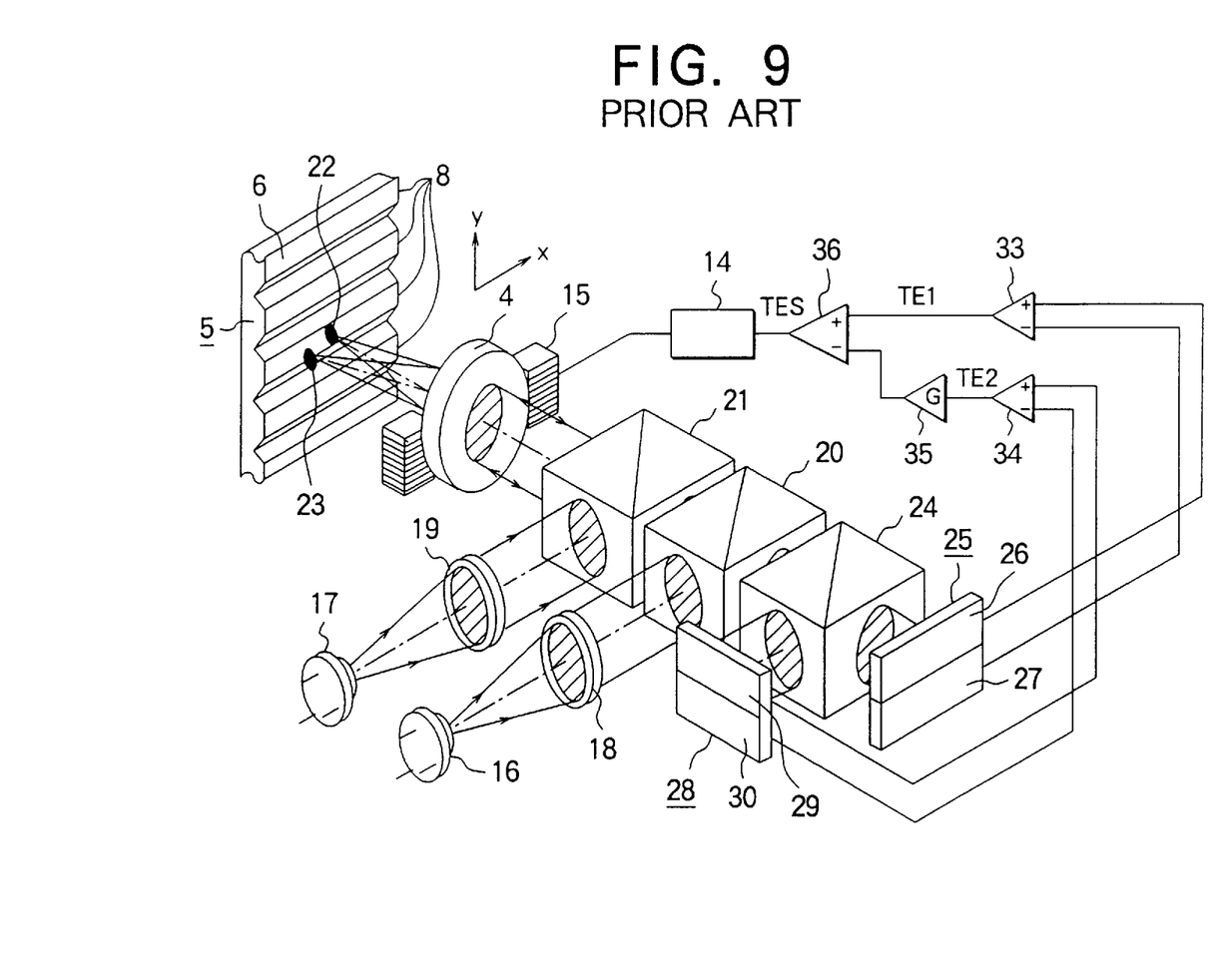
FIG. 9 is a perspective view showing the configuration of another conventional tracking error detection device.

FIG. 9 is a perspective view showing the configuration of another conventional tracking error detection device shown in Japanese Patent Kokoku Publication No. 34212/1992. In the figure, reference numerals 16 and 17 denote light sources such as a semiconductor laser, from which light beams with different wavelengths are emitted (the oscillation wavelength from the light source 16 is represented by $\lambda 1$ while the oscillation wavelength from the light source 17 is represented by $\lambda 2$). Reference numerals 18 and 19 denote collimator lenses for converting light beams from the light sources 16 and 17 into parallel beams. Reference numeral 20 denotes a beam splitter which deflects the parallel beam with wavelength $\lambda 1$ output from the collimator lens 18 by 90 degrees and directs the beam to the objective lens 4. Reference numeral 21 denotes another beam splitter which deflects the parallel beam with wavelength $\lambda 2$ output from the collimator lens 19 by 90 degrees and directs the beam to the objective lens 4. The beam splitters 20 and 21 in combination serve to merge the light beams from the light sources 16 and 17. Reference numerals 22 and 23 denote light spots formed on the information recording surface 6 of the information recording medium 5. The light spot 22 is of the light beam having wavelength $\lambda 1$ while the light spot 23 is of the light beam having wavelength $\lambda 2$.

The two light beams reflected by the information recording medium 5 are re-converted into parallel beams by the objective lens 4. The beams pass through the beam splitters 20 and 21, then reaches the dichroic beam splitter 24. The dichroic beam splitter 24 passes the light beam with wavelength $\lambda 1$ and reflects the light beam with wavelength $\lambda 2$. The beam splitter 24 thus divides the light beams from the information recording medium 5 into the light beam having the wavelength $\lambda 1$ and the light beam having the wavelength $\lambda 2$. Reference numerals 25 and 28 denote split photodetectors, which have two light-receiving faces 26 and 27, and 29 and 30 respectively. The beam returning from the light spot 22 of the light beam with wavelength $\lambda 1$ passes through the dichroic beam splitter 24 and reaches the split photodetector 25. The beam returning from the light spot 23 of the light beam with wavelength $\lambda 2$ is reflected by the dichroic beam splitter 24 and reaches the split photodetector 28.

Figure 10:
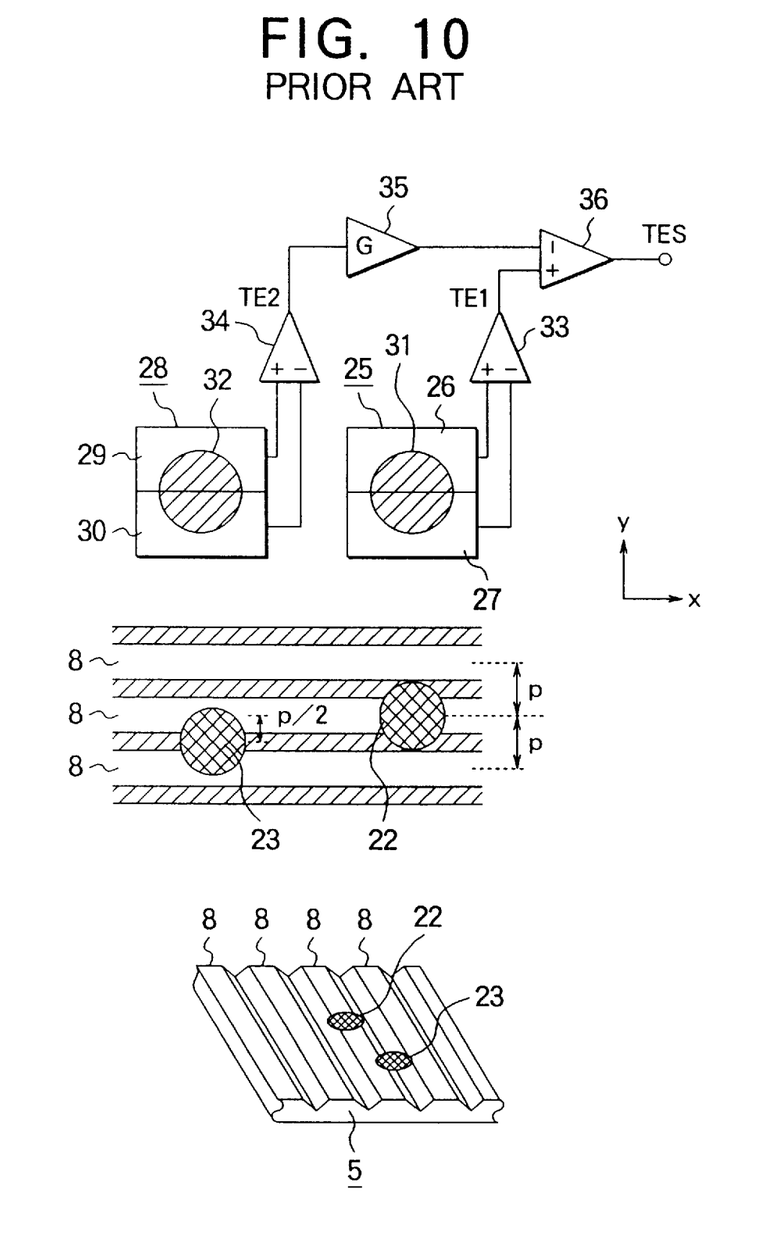
FIG. 10 shows the relative positions of light spots on an information recording surface, split photodetectors, and a circuit for generating a tracking error signal in another conventional tracking error detection device.

FIG. 10 shows the relative positions of the light spots 22 and 23 on the information recording surface 6, the corresponding light spots on the split photodetectors 25 and 28, and a circuit for generating a tracking error signal. The figure shows that the information recording surface 6 of the information recording medium 5 has grooves and lands on it and that the tracks 8 are formed on the lands. The two light spots 22 and 23 are disposed with a spacing of p/2 in the y direction (direction perpendicular to the track), where p is the track pitch. Reference numerals 31 and 32 denote the light spots corresponding to the light spots 22 and 23 respectively on the split photodetectors. The outputs from the two light-receiving faces 26 and 27 of the single split photodetector 25 are input to the differential amplifier 33, from which differential output TE1 is obtained and supplied to the next differential amplifier 36. The outputs from the two light-receiving faces 29 and 30 of another split photodetector 28 are input to the differential amplifier 34, from which differential output TE2 is obtained. TE2 is supplied via the variable-gain amplifier 35 having gain G to the differential amplifier 36. The differential amplifier 36 outputs a difference between TE1 and TE2 multiplied by G, which is treated as tracking error signal TES. The tracking error signal TES is supplied via the phase-compensation circuit/amplifier 14 to the objective lens driving mechanism 15.

Next, it will be briefly described that the tracking error signal TES is free from the offset caused by the lateral movement of the objective lens. As described above, the offset results from the lateral movement of the spots on the split photodetector in the same direction caused by the lateral movement of the objective lens. In FIG. 10, the two spots 31 and 32 move in the y direction. The light-receiving faces 26 and 29 receive a greater amount of light than the light receiving faces 27 and 30. This causes a positive offset in TE1 and TE2, as indicated by a chain line in FIG. 11. When the optical disk is eccentric relative to the axis of rotation, the track crossing component of the tracking error signal caused by a light spot crossing the tracks 8 on the time base varies in a sinusoidal fashion, whose time period corresponds to the time while the optical disk makes one revolution. Because the spacing between the light spots 22 and 23 in the y direction is just a half of the track pitch, the differential outputs TE1 and TE2 have opposite phases, as shown in FIG. 11.

Figure 11:
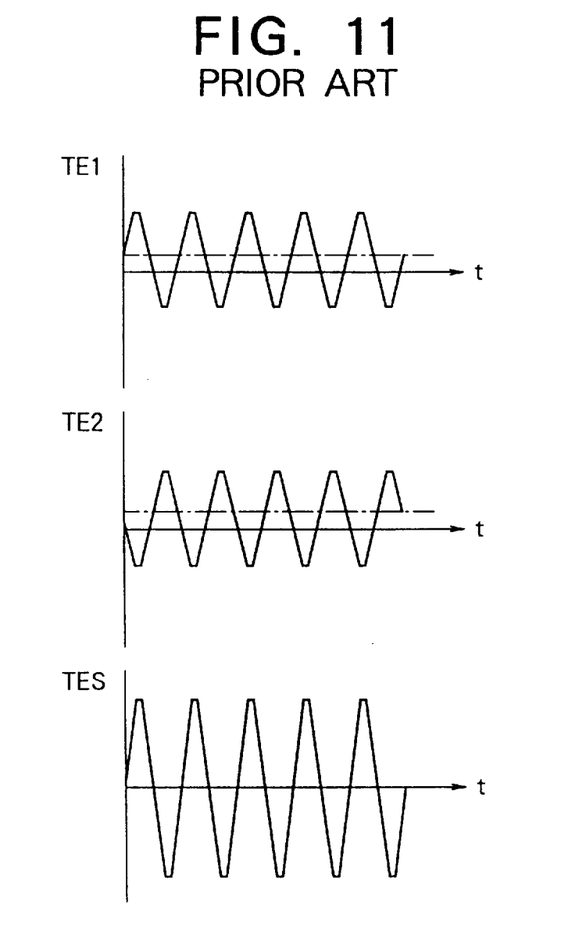
FIG. 11 shows the differential outputs of split photodetectors and tracking error signals in another conventional tracking error detection device.

When the gain G of the variable-gain amplifier 35 is adjusted to the ratio of the offset of the differential output TE1 to the offset of the differential output TE2, the offset can be eliminated from the tracking error signal TES, as shown in FIG. 11. The offset caused by a tilt of an information recording medium can be eliminated in the same way.

Since the latter conventional tracking error detection device is configured as described above, the amplitude of the tracking error signal depends on the ratio of the spacing between the two light spots to the track pitch of the information recording medium. The dependence causes a problem especially when a single optical head is used to reproduce optical disks of different types with different track pitches. For example, let us assume that an optical head is adjusted so that the spacing s between the light spots is half the track pitch of a first type of optical disk having a track pitch p1, i.e., s=p½, so that the amplitude of the tracking error signal is maximized. When this optical head is used with a second type of optical disk having a track pitch p2, which is about half the track pitch p1, the spacing s between the light spots is about equal to the track pitch p2, and resultant amplitude of the tracking error signal will be almost zero. This is because, in this method, the amplitude of the tracking error signal is maximized when the spacing between two light spots is an odd multiple of a half of the track pitch, and the amplitude is zero when the spacing is an integral multiple of the track pitch.

SUMMARY OF THE INVENTION

The invention has been made to solve the problems described above, and its object is to provide an optical head tracking error detection device which can reduce the offset caused by the lateral movement of the objective lens or a tilt of the information recording medium and can maintain the maximum amplitude of the tracking error signal, irrespective of variations in track pitch of the information recording medium.

Another object of the invention is to simplify the configuration of an optical system of an optical head tracking error detection device.

An optical head tracking error detection device according to a first aspect of the invention includes:

a device for directing and focusing two light beams onto an information recording medium to form first and second light spots;

first and second split photodetectors for respectively receiving the light beams returning from the respective light spots on the information recording medium, each of the split photo detectors having a pair of light receiving faces, and each of the light receiving faces receiving a substantially equal portion of the returning light if the light spots are just focused on the information recording medium and are tracking correctly;

means for producing a tracking error signal on the basis of the difference between differential outputs of the first and second split photodetectors; and phase difference adder for introducing a phase difference of substantially 180 degrees between substantially-half portions of one of the two beams directed to the information recording medium;

the directing and focusing device disposes said light spots on the information recording medium such that a spacing between the light spots in the direction perpendicular to tracks on the information recording medium is substantially an integral multiple of track pitch.

According to the above optical head tracking error detection device, the offset components included in the differential outputs of a pair of split photodetectors are in phase and the track crossing components have opposite phases. Consequently, the offset components can be eliminated from the tracking error signal, which is the difference of differential outputs obtained from the pair of split photodetectors.

Accordingly, the offset and the dependence of the detection sensitivity on the track pitch can be minimized.

An optical head tracking error detection device according to a second aspect of the invention includes:

a device for directing and focusing three light beams onto an information recording medium to form first, second and third light spots on the information recording medium;

first, second and third split photodetectors for respectively receiving the light beams returning from the first, second and third light spots on the information recording medium, each of the split photo detectors having a pair of light receiving faces, and each of the light receiving faces receives a substantially equal portion of the returning light if the light spots are just focused on the information recording medium and are tracking correctly; and a device for producing a tracking error signal on the basis of differential outputs of the first, second and third split photodetectors;

wherein the directing and focusing device includes a diffraction grating having first and second sections respectively having periodic structures which are out of phase by about 180 degrees, for giving a phase difference of substantially 180 degrees to substantially-half portions of the two of the three beams; and disposes light spots on the information recording medium such that a spacing between two adjacent light spots in the direction perpendicular to tracks on the information recording medium is substantially an integral multiple of track pitch.

According to the above optical head tracking error detection device, the differential outputs of three split photodetectors include offset components which are all in phase. The track crossing components of the differential outputs obtained from two of the three split photodetectors are 180 degrees out of phase with the differential output of the remaining one split photodetectors. Consequently, the offset components can be eliminated from the tracking error signal obtained by adding and subtracting the differential outputs of three split photodetectors.

Accordingly, the offset and the dependence of the detection sensitivity on the track pitch can be minimized, and the requirements of the positioning accuracy of the light spots and the accuracy of the phase difference of the phase difference adder can be relaxed.

DETAILED DESCRIPTION OF THE PREFERRED EMBODIMENTS

This invention will be described in detail with reference to the drawings showing embodiments of the invention.

Embodiment 1

Figure 1:
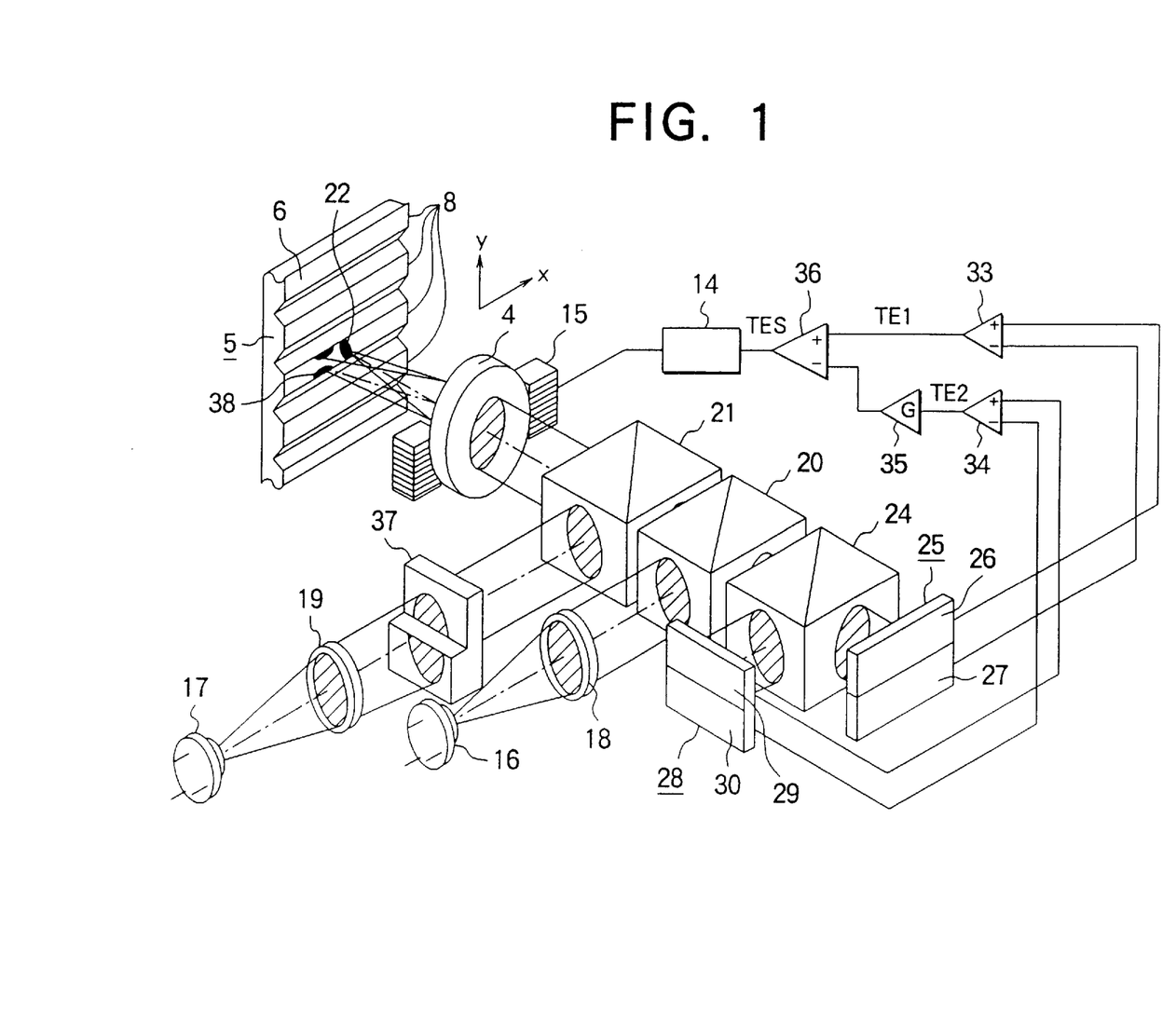
FIG. 1 is a perspective view showing the configuration of an optical head tracking error detection device in Embodiment 1 of the invention.

FIG. 1 is a perspective view showing the configuration of an optical head tracking error detection device of Embodiment 1 of the invention. In the figure, reference numerals 4 to 6, 8, 14 to 22, 24 to 30, and 33 to 36 denote members identical to those in FIGS. 8 and 9 showing conventional tracking error detection devices. Reference numeral 37 denotes phase difference adder for giving a phase difference of about 180 degrees between substantially-half portions of the light beam emitted from the light source 17. Reference numeral 38 denotes a light spot formed by the light beam emitted from the light source 17 on the information recording surface 6 of the information recording medium 5.

Figure 2:
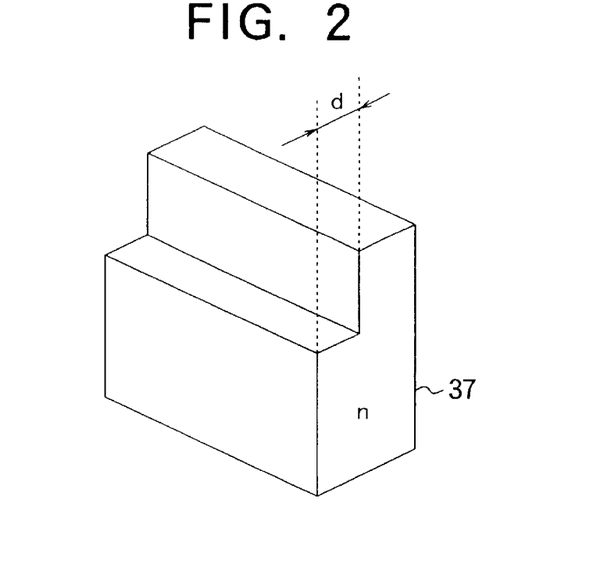
FIG. 2 is a schematic representation of an example of the phase difference addition means included in FIG. 1.

FIG. 2 is a schematic representation of an example of the phase difference adder means included in FIG. 1. The phase difference adder 37 is made of a plate of a transparent material having a refractive index of n and has two levels separated by a line running substantially through its center, at which the thickness changes by d. The incident light beam is divided at the linear part where the thickness changes. The upper half circle and the lower half circle are given a phase difference proportional to the thickness change d. To make the phase difference equal to 180 degrees, d should be set so that (n−1)d is a half of the wavelength λ2 of the light source 17. When n equals 1.5 and λ2 equals 0.78 μm, for example, d should be 0.78 μm.

Figure 3:
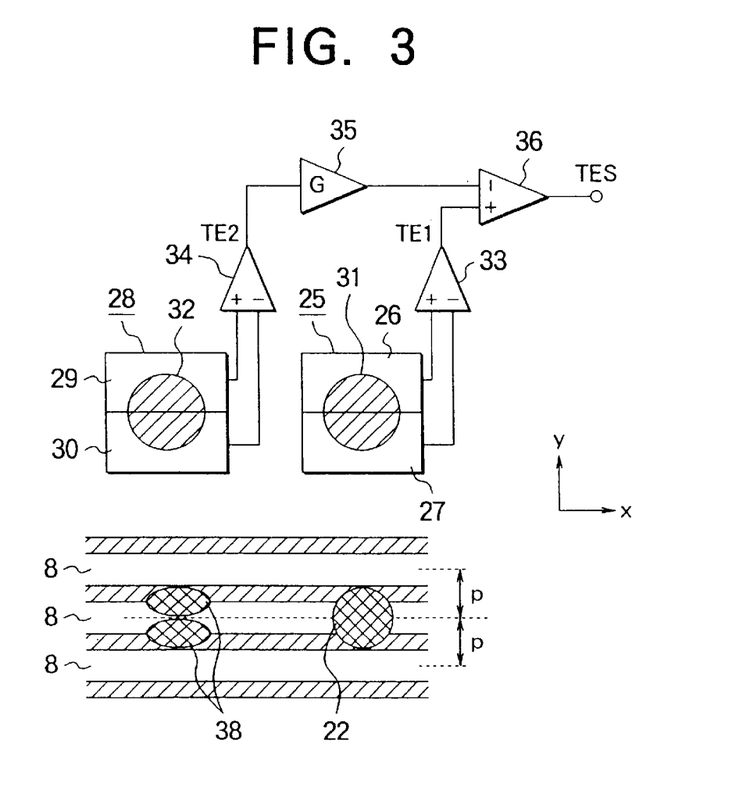
FIG. 3 shows the relative positions of light spots on an information recording surface, split photodetectors, and a circuit for generating a tracking error signal in Embodiment 1 of the invention.

FIG. 3 shows the relative positions of the light spots 22 and 38 on the information recording surface 6, light spots on the corresponding split photodetectors 25 and 28, and a circuit for generating a tracking error signal in Embodiment 1 of the invention. In the figure, reference numerals 8, 22, and 25 to 36 denote members identical to those in FIGS. 8 and 9, which show examples of prior art. The circuit for generating a tracking error signal is the same as the circuit of prior art shown in FIG. 10. FIG. 3 shows the following differences from the prior art: the light spot 38 is not substantially circular but is made of two elliptical subspots, which results from a phase difference of about 180 degrees between substantially-half portions of the light beam from the light source 17; and the spacing in the y direction (direction perpendicular to the tracks) between the light spots 38 and 22 is zero. Here, the spacing between the light spots 22 and 38 is defined by the distance in the lateral direction of the track between the center of the light spot 22 and the midpoint between the centers of the sub-spots forming the light spot 38. FIG. 3 shows two light spots disposed with no spacing in the y direction, however, in general terms the spacing may be an integral multiple of the track pitch. That is, the expression "an integral multiple of the track pitch" as used in the appended claims should be construed to include a situation where the spacing is zero.

The principle of generation of a tracking error signal in the push-pull method, which will be needed to describe the operation of Embodiment 1, will next be described, based on Hopkins' theory. The complex amplitude distribution of the directed light on the exit pupil of an objective lens, represented by a(x, y), can be generally expressed as follows:

$$a(x, y) = \tau(x, y) \cdot \exp\{2\pi i \cdot W(x, y)\} \tag{1}$$

where τ(x, y) is the absolute value of the amplitude distribution of the directed light and W(x, y) is the wavefront aberration. For ease of explanation in the subsequent description, τ(x, y) is assumed to be 1, and W(x, y) is assumed to be zero. In other words, it is assumed that the amplitude distribution on the pupil is uniform and that there is no aberration. The complex amplitude distribution of the light returning from a disk on a photodetector, Ad(x', y'), is given by the following expression:

$$Ad(x', y') = \Sigma R_n \cdot \exp\{-2\pi i \cdot n v_0/q\} \cdot a(-x', -y' + n/q) \quad (2)$$

It is assumed here that the optical disk is uniform in the x direction but has periodicity in the y direction (direction perpendicular to the tracks). $v_0$ is a normalized track deviation, and q is a normalized track pitch.

The complex amplitude distribution of reflected light in the area A (see FIG. 4) where the zeroth-order reflected light overlaps the reflected light subjected to the first-order (n=1) diffraction caused by the periodicity of the optical disk, represented by $Ad_1$, given by the following equation:

$$Ad_1 = R_0 + R_1 \exp\{-2\pi i \cdot v_0/q\} \quad (3)$$

The complex amplitude distribution of reflected light in the area B (see FIG. 4) where the zeroth-order reflected light overlaps the reflected light subjected to the minus-first-order (n=−1) diffraction caused by the periodicity of the optical disk, represented by $Ad_{-1}$, is given by the following equation:

$$Ad_{-1} = R_0 + R_{-1} \exp\{2\pi i \cdot v_0/q\} \quad (4)$$

Substituting $R_1$ and $R_{-1}$ that can be expressed as follows:

$$R_1 = \alpha_1 \cdot \exp(i\psi_1) R_0 \quad (5)$$

$$R_{-1} = \alpha_{-1} \cdot \exp(i\psi_{-1}) R_0 \quad (6)$$

into the expressions (2) and (3) yields:

$$Ad_1 = R_0[1 + \alpha_1 \exp\{i(\psi_1 - 2\pi \cdot v_0/q)\}] \quad (7)$$

$$Ad_{-1} = R_0[1 + \alpha_{-1} \exp\{i(\psi_{-1} + 2\pi \cdot v_0/q)\}] \quad (8)$$

The light intensity distributions in the areas A and B are given by the square of the equations (7) and (8) respectively, as shown below:

$$|Ad_1|^2 = |R_0|^2[(1+\alpha_1^2) + 2\alpha_1 \cdot \cos(\psi_1 - 2\pi \cdot v_0/q)] \quad (9)$$

$$|Ad_{-1}|^2 = |R_0|^2[(1+\alpha_{-1}^2) + 2\alpha_{-1} \cdot \cos(\psi_{-1} + 2\pi \cdot v_0/q)] \quad (10)$$

Figure 4:
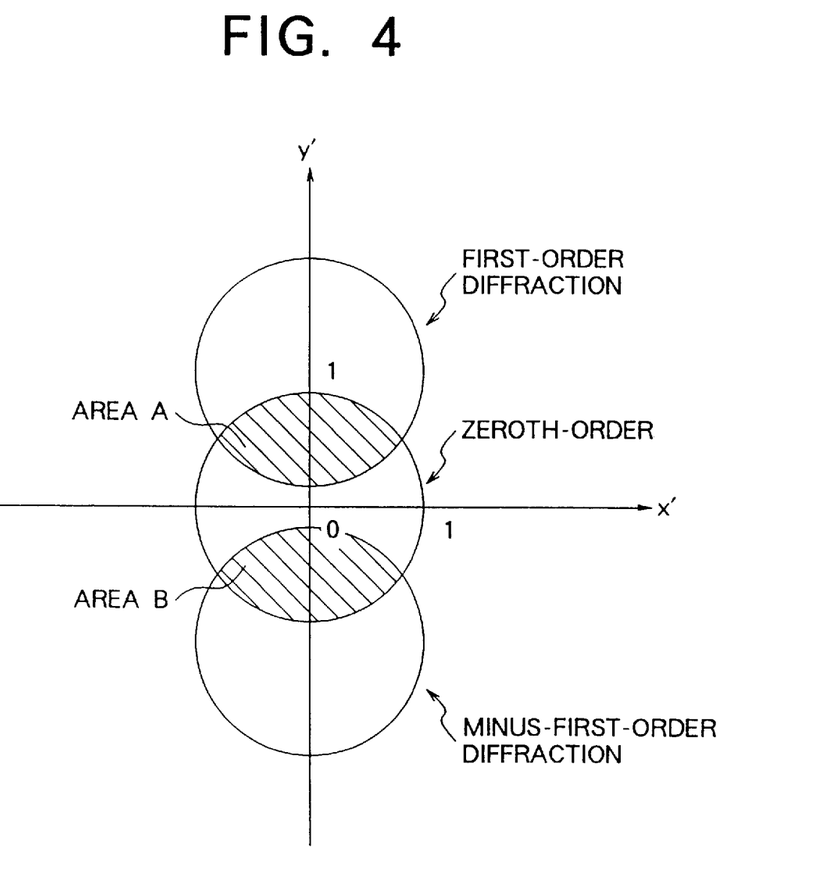
FIG. 4 shows the light reflected by the optical disk in Embodiment 1 of the invention.

When the two light-receiving faces of a split photodetector are disposed in a half area of Y'>0 including the area A, and in another half area of y'<0 including the area B, the outputs from the two light-receiving faces, represented by $Id_1$ and $Id_{-1}$, are given by the following equations:

$$Id_1 = K_1 \cdot |Ad_1|^2 + I_0/2 \quad (11)$$

$$Id_{-1} = K_{-1} \cdot |Ad_{-1}|^2 + I_0/2 \quad (12)$$

where $K_1$ and $K_{-1}$ are the products of the sensitivity of the light-receiving faces and the size of the areas A and B, and $I_0$ is an output current from the area hit just by the zeroth-order light in the vicinity of the origin shown in FIG. 4. The tracking error signal TES is given as a difference between $Id_1$ and $Id_{-1}$.

If two light-receiving faces are equal in sensitivity and size and if an optical disk has such a periodic structure that is symmetric about a plane perpendicular to the surface of the disk and passing the center line of the track, (strictly, passing a line tangential to the center line of the track), these equations are satisfied:

$$K_1 = K_{-1}, \alpha_1 = \alpha_{-1}, \psi_1 = \psi_{-1}$$

Substituting these in the equations (11) and (12) yields the following tracking error signal TE:

$$TE = K_1|R_0|^2 \cdot 4\alpha_1 \sin\psi_1 \cdot \sin(2\pi \cdot v_0/q) \quad (13)$$

The principle of generating a tracking error signal in the push-pull method from a beam having halves 180 degrees out of phase, which is characteristic to Embodiment 1 will next be described, based on Hopkins's theory. The complex amplitude distribution of the directed light on the exit pupil of an objective lens, represented by $a_{inv}(x, y)$, can be expressed as follows:

$$_{inv}(x, y) = \tau_{inv}(x, y) \cdot \exp\{2\pi i \cdot W_{inv}(x, y)\} \quad (14)$$

As in the preceding description, $\tau_{inv}(x, Y) = 1$ is assumed. Since two halves of the beam are 180 degrees out of phase, $W_{inv}(x, y)$ can be expressed as follows:

$$W_{inv}(x, y) = 0.25 \text{ (when } y > 0)$$

$$W_{inv}(x, y) = -0.25 \text{ (when } y < 0) \quad (15)$$

The complex amplitude distribution of the light reflected by a disk on a photodetector, represented by $Ad_{inv}(x', y')$, is given by the following expression:

$$Ad_{inv}(x', y') = \Sigma R_n \cdot \exp\{-2\pi i \cdot n v_0/q\} \cdot a(-x', -y' + n/q) \quad (16)$$

The complex amplitude distribution of reflected light in the area A where the zeroth-order reflected light overlaps the reflected light subjected to the first-order (n=1) diffraction caused by the periodicity of the optical disk, represented by $Ad_{1inv}$, satisfies the following equation:

$$Ad_{1inv} = R_0 \cdot a(-x', -y') + R_1 \exp\{-2\pi i \cdot v_0/q\} \cdot a_{inv}(-x', -y' + 1/q) \quad (17)$$

Since the area A is normally in an area of y'>0, $a_{inv}(-x', -y')$ in the equation given above can be calculated as follows:

$$\begin{aligned}a_{inv}(-x', -y') &= \exp\{2\pi i \cdot W_{inv}(-x', -y')\} \\ &= \exp\{2\pi i \cdot (-0.125)\} \\ &= \exp(-i \cdot \pi/2)\end{aligned} \quad (18)$$

Since the value of 1/q of a normal optical disk is around 1, (−y'+1/q) is positive in most cases. $a_{inv}(-x', -y'+1/q)$ in the area A is therefore calculated as follows:

$$\begin{aligned}a_{inv}(-x', -y' + 1/q) &= \exp\{2\pi i \cdot W_{inv}(-x', -y' + 1/q)\} \\ &= \exp\{2\pi i \cdot (0.25)\} \\ &= \exp(i \cdot \pi/2)\end{aligned} \quad (19)$$

Substituting the equations (18) and (19) into the equation (17) yields the following:

$$\begin{aligned}Ad_{1inv} &= R_0 \cdot \exp(-i \cdot \pi/2) + \\ &\quad R_1 \cdot \exp\{-2\pi i \cdot v_0/q\} \cdot \exp\{i \cdot \pi/2\} \\ &= \exp(-i \cdot \pi/2) \cdot [R_0 - R_1 \cdot \exp\{-2\pi i \cdot v_0/q\}]\end{aligned} \quad (20)$$

The complex amplitude distribution of reflected light in the area B where the zeroth-order reflected light overlaps the reflected light subjected to the minus-first-order (n=−1) diffraction caused by the periodicity of the optical disk, represented by $Ad_{-1inv}$, is given by the following equation:

$$Ad_{-1inv} = R_0 \cdot a(-x', -y') + R_{-1} \exp\{2\pi i \cdot v_0/q\} \cdot a_{inv}(-x', -y' - 1/q) \quad (21)$$

Since the area B is normally in an area of y'<0, $a_{inv}(-x', -y')$ in the equation given above can be calculated as follows:

$$a_{inv}(-x', -y') = \exp\{2\pi i \cdot W_{inv}(-x', -y')\} \quad (22)$$
$$= \exp\{2\pi i \cdot (0.25)\}$$
$$= \exp(i \cdot \pi/2)$$

Since the value of $1/q$ of a normal optical disk is around 1, $(-y'-1/q)$ is negative in most cases. $a_{inv}(-x', -y'-1/q)$ of the area B is therefore calculated as follows:

$$a_{inv}(-x', -y' + 1/q) = \exp\{2\pi i \cdot W_{inv}(-x', -y' + 1/q)\} \quad (23)$$
$$= \exp\{2\pi i \cdot (-0.25)\}$$
$$= \exp\{-i \cdot \pi/2\}$$

Substituting the equations (22) and (23) into the equation (21) yields the following:

$$Ad_{-1inv} = R_0 \cdot \exp(i \cdot \pi/2) + \quad (24)$$
$$R_{-1} \cdot \exp\{2\pi i \cdot v_0/q\} \cdot \exp\{-i \cdot \pi/2\}$$
$$= \exp(i \cdot \pi/2) \cdot [R_0 - R_{-1} \cdot \exp\{2\pi i \cdot v_0/q\}]$$

Substituting the expressions (5) and (6) in the equations (23) and (24) yields the following:

$$Ad_{1inv} = \exp(-i\cdot\pi/2)\cdot R_0[1-\alpha_1\cdot\exp\{i(\psi_1-2\pi\cdot v_0/q)\}] \quad (25)$$

$$Ad_{-1inv} = \exp(i\cdot\pi/2)\cdot R_0[1-\alpha_{-1}\cdot\exp\{i(\psi_{-1}+2\pi\cdot v_0/q)\}] \quad (26)$$

The light intensity distributions in the areas A and B are given by the square of the equations (25) and (26) respectively, as shown below:

$$|Ad_{1inv}|^2 = |R_0|^2[(1+\alpha_1^2) - 2\alpha_1\cdot\cos(\psi_1 - 2\pi\cdot v_0/q)] \quad (27)$$

$$|Ad_{-1inv}|^2 = |R_0|^2[(1+\alpha_{-1}^2) - 2\alpha_{-1}\cdot\cos(\psi_{-1} + 2\pi\cdot v_0/q)] \quad (28)$$

The outputs from the two light-receiving faces, represented by $Id_{1inv}$ and $Id_{-1inv}$, satisfy the following equations:

$$Id_{1inv} = K_1 \cdot |Ad_{1inv}|^2 + I_0/2 \quad (29)$$

$$Id_{-1inv} = K_{-1} \cdot |Ad_{-1inv}|^2 + I_0/2 \quad (30)$$

The tracking error signal $TE_{inv}$ is given as a difference between $Id_{1inv}$ and $Id_{-1inv}$.

$$TE_{inv} = K_1|R_0|^2 \cdot 4\alpha_1 \cdot [-\sin(2\pi\cdot v_0/q)] \quad (31)$$

The expression of $TE_{inv}$ is the same as the expression of TE, except the signs are inverted. This indicates that $TE_{inv}$ and TE have opposite phases about the track deviation, but otherwise they are equal.

With reference to FIG. 3, it will be described next that almost all offset components caused by the lateral movement of the objective lens and other reasons are eliminated from the tracking error signal TES obtained in Embodiment 1. When the amount of lateral movement of the objective lens is u, the differential output TE1 obtained in the usual push-pull method can be expressed by the use of the equation (13), as follows:

$$TE1 = A1 \cdot \sin(2\pi\cdot v_0/q) + B1 \cdot u \quad (32)$$

where $B1 \cdot u$ is the offset component proportional to u when u is small. The offset component occurs when the light spot 31 on the photodetector 25 moves in the positive y direction. A1 is the amplitude of the track crossing component. The differential output TE2 in the push-pull method obtained from a beam having halves 180 degrees out of phase under the same condition can be given by the equation (31), as shown below:

$$TE2 = -A2 \cdot \sin(2\pi\cdot v_0/q) + B2 \cdot u \quad (33)$$

where $B2 \cdot u$ is the offset component proportional to u when u is small. The offset component occurs when the light spot 32 on the photodetector 28 moves in the positive y direction. (This indicates that the lateral movement of an objective lens causes the spots 31 and 32 to move in the same direction. The coefficient B2 has the same sign as the coefficient B1.)

As described above, the track crossing component of TE2 is 180 degrees out of phase with TE1, and −A2 is the amplitude of the track crossing component (the coefficient A2 has the same sign as the coefficient A1). When the gain G of a variable-gain amplifier equals the ratio of B1 to B2, the following tracking error signal TES is obtained:

$$TES = TE1 - (B1/B2) \cdot TE2 = A1 \cdot \sin(2\pi\cdot v_0/q) + (B1/B2)A2 \cdot \sin(2\pi\cdot v_0/q) = \{A1 + (B1/B2)A2\} \cdot \sin(2\pi\cdot v_0/q) \quad (34)$$

This indicates that the offset component can be eliminated from the tracking error signal TES.

It is clear that, when an optical disk tilts, the light spots 31 and 32 moves in the same direction on the photodetector. Consequently, the offset component can be eliminated from the tracking error signal TES.

In the conventional tracking error detection devices, the amplitude of the tracking error signal depends on the ratio of the spacing between two light spots to the track pitch of the information recording medium. In the tracking error detection device of Embodiment 1, however, two light spots are disposed parallel with tracks, as shown in FIG. 3. Consequently, a problem which arises when a single optical head reproduces optical disks of different types with different track pitches can be solved, and the amplitude of the tracking error signal will not be almost zero with any track pitch. This is because two light spots are parallel with tracks, irrespective of the track pitch.

Embodiment 2

Figure 5:
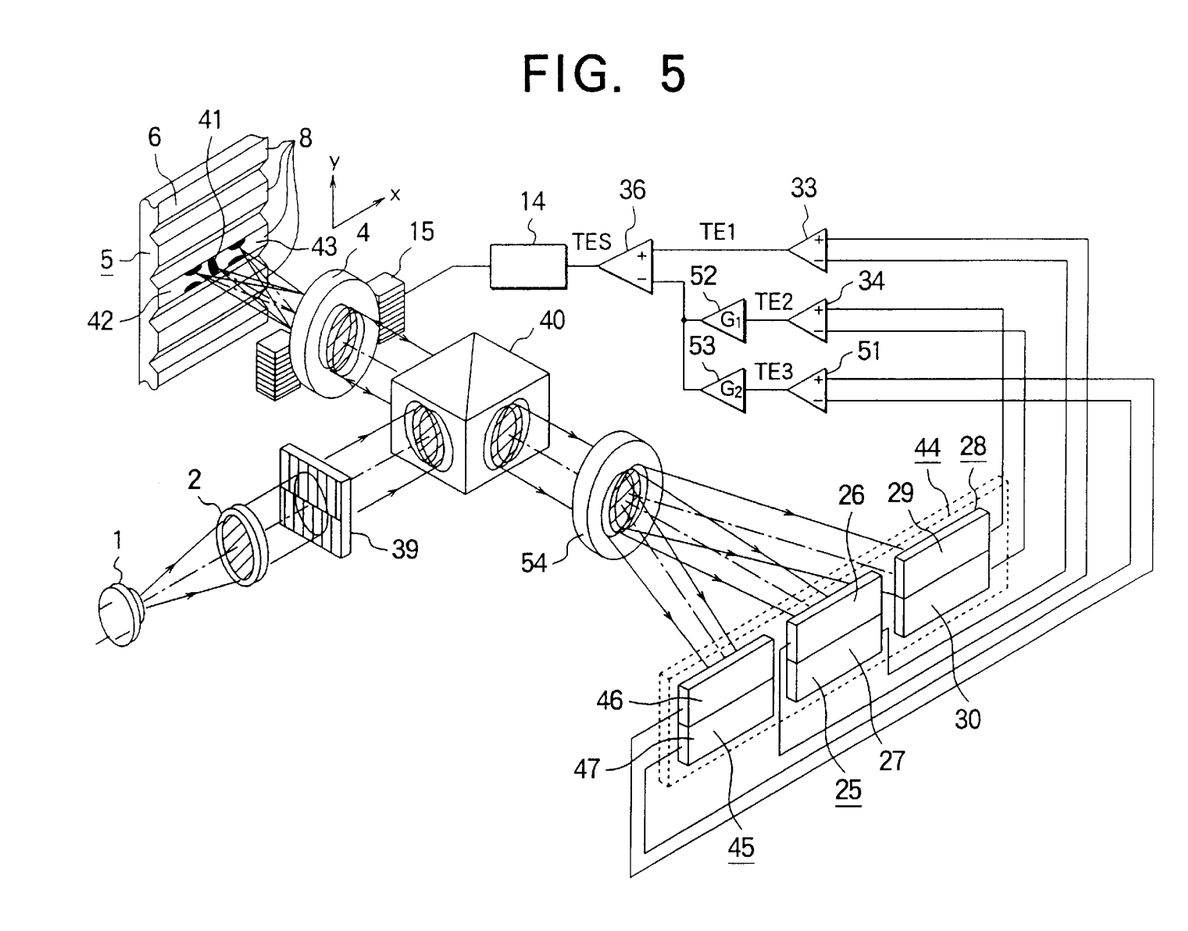
FIG. 5 is a perspective view showing the configuration of an optical head tracking error detection device in Embodiment 2 of the invention.
Figure 7:
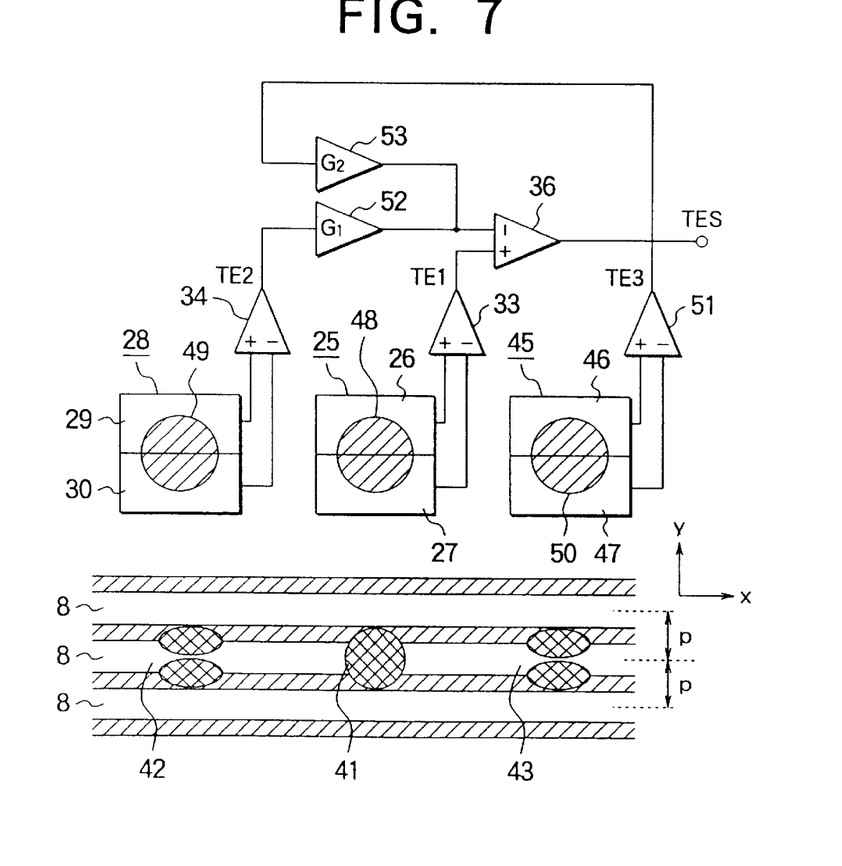
FIG. 7 shows the relative positions of light spots on an information recording surface, split photodetectors, and a circuit for generating a tracking error signal in Embodiment 2 of the invention.

FIG. 5 is a perspective view showing the configuration of a tracking error detection device of Embodiment 2 of the invention. In the figure, reference numerals 1, 2, 4, 5, 6, 8, 9, 14, and 15 denote members identical to those conventional tracking error detection devices shown in FIGS. 8 and 9. Reference numeral 39 denotes a diffraction grating which divides a light beam from the light source 1 into three light beams and functions as phase difference adder for giving a phase difference of about 180 degrees between substantially-half portions of each of two of the three light beams. Reference numeral 40 denotes a beam splitter which reflects the parallel beams from the collimator lens 2 and passes the beam reflected by the information recording medium 5. Reference numerals 41, 42, and 43 are three light spots formed on the information recording surface 6. The beams returning from the three light spots 41, 42, and 43 are passed through a converging lens 54 and received by three split photodetectors 25, 28, and 45 incorporated in a single package. The split photodetector 45 is an addition to Embodiment 1, and it has two light-receiving faces 46 and 47. As shown in FIG. 7, which will be described later, the light spots 48, 49, and 50 are formed on the three split photodetectors 25, 28, and 45 respectively. Reference numeral 51 denotes a differential amplifier to which the outputs of the split photodetector 45 are supplied. Reference numerals 52 and 53 denote variable-gain amplifiers of which gains are G1 and G2 respectively.

Figure 6:
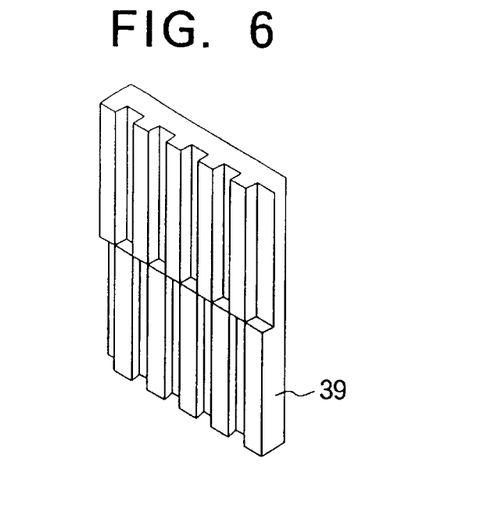
FIG. 6 is a schematic representation of the structure of a diffraction grating provided as phase difference addition means in Embodiment 2 of the invention.

FIG. 6 is a schematic representation of the structure of the diffraction grating 39, which is provided as phase difference adder in Embodiment 2 of the invention. The grating 39 is generally made of a plate of an optical glass or other transparent material having the first and second sections, each provided with an array of linear concaves and convexes adjacent to each other, which are formed by photolithographic etching, or other process. In an ordinary optical head, the period of the diffraction grating is set between 10 and 100 μm. As is clear from the figure, the periodic structures of the upper and lower haves or sections are 180 degrees out of phase. It will next be described whether the diffraction grating 39 can generate a phase difference of 180 degrees between the upper and lower halves of the first-order and minus-first-order diffracted beams.

When uniform light beams are directed to a diffraction grating, the amplitude distribution of the light immediately after the diffraction grating, represented by $u_1(x_1)$, is given by the following:

$$u_1(x_1)=h(x_1) \text{ (when } y_1>0: \text{ upper half)}$$

$$u_1(x_1)=h(x_1-X_0) \text{ (when } y_1<0: \text{ lower half, } X_0=\Lambda/2) \quad (35)$$

where $\Lambda$ is the period of the diffraction grating.

The relationship between the diffracted lights of the upper and lower halves will next be found by using the formula of Fraunhofer diffraction. The complex amplitude distribution of diffracted light from the area of $y_1>0$, represented by $u_{2a}(x_2)$, is given by the following equation:

$$u_{2a}(x_2)=k\int(x_1)\cdot\exp(i\cdot 2\pi x_1 x_2/\lambda L)dx_1 \quad (36)$$

where $\lambda$ is the wavelength of the light beam and L is the propagation distance.

The complex amplitude distribution of diffracted light from the area of $y_1<0$, represented by $u_{2b}(x_2)$, is given by the following equation:

$$u_{2b}(x_2)=k\int h(x_1-X_0)\cdot\exp(i\cdot 2\pi x_1 x_2/\lambda L)dx_1 \quad (37)$$

Substituting $x_1-X_0=s$ in the equation given above yields the following:

$$u_{2b}(x_2)=k\int h(s)\cdot\exp\{i\cdot 2\pi x_2(s+X_0)/\lambda L\}ds = k\cdot\exp(i\cdot 2\pi x_2 X_0/\lambda L)\cdot\int h(s)\cdot\exp\{i\cdot 2\pi x_1 s/\lambda L\}ds = \exp(i\cdot 2\pi x_2 X_0/\lambda L)\cdot u_{2a}(x_2) = \exp(i\cdot \pi x_2 \Lambda/\lambda L)\cdot u_{2a}(x_2) \quad (38)$$

When the light beam propagates by L, the $x_2$ coordinate of the position of the plus/minus-first-order diffracted light is $\pm L\cdot(\lambda/\Lambda)$. Substituting $\pm L\cdot(\lambda/\Lambda)$ for $x_2$ in the expression given above yields the following:

$$u_{2b}(\pm L\cdot(\lambda/\Lambda))=\exp(\{i\pi\})\cdot u_{2a}(\pm L\cdot(\lambda/\Lambda)) \quad (39)$$

This indicates that the diffraction grating can generate a phase difference of +180 degrees between the upper and lower halves of the first-order diffracted light and a phase difference of -180 degrees between the upper and lower halves of the minus-first-order diffracted light.

FIG. 7 shows the relative positions of the three light spots 41, 42, and 43 on the information recording surface 6, light spots on the corresponding split photodetectors 25, 28 and 45, and a circuit for generating a tracking error signal in Embodiment 2 of the invention. In the figure, reference numeral 41 denotes a light spot by the zeroth-order diffracted light, 42 denotes a light spot by the minus-first-order diffracted light, and 43 denotes a light spot by the first-order diffracted light. The circuit for generating a tracking error signal TES is similar to the corresponding circuit of Embodiment 1 shown in FIG. 3, but the differential amplifier 51 which outputs the difference between the outputs of the split photodetector 45 and the variable-gain amplifier 53 with gain G2 which receives the differential output TE3 of the differential amplifier 51 are added; and the variable-gain amplifier 35 with gain G in FIG. 3 is replaced by the variable-gain amplifier 52 with gain G1. The differential output TE1, differential output TE2 multiplied by G1, and differential output TE3 multiplied by G2 are supplied to the differential amplifier 36, which outputs the tracking error signal TES. Of the three light spots 41, 42, and 43 on the information recording surface 6, the light spot 41 is substantially circular, as is usual, and the light spots 42 and 43 consist of two elliptical subspots. The diffraction grating 39 is rotated for adjustment so that the spacing in the y-direction (direction perpendicular to the tracks) between two adjacent spots of the light spots 41, 42, and 43 is substantially zero. Here, the spacing between the adjacent light spots, e.g., 41 and 42, is defined by the distance in the lateral direction of the track between the center of the light spot 41 and the midpoint between the centers of the subspots forming the light spot 42. In FIG. 7, the spacing between adjacent light spots is zero. However, in general terms the spacing may be an integral multiple of the track pitch. That is, the expression "an integral multiple of the track pitch" as used in the appended claims should be construed to include a situation where the spacing is zero.

It will be described next that the offset components can be eliminated from the tracking error signal TES in Embodiment 2 as well. The principle of the elimination of the offset components is the same as that in Embodiment 1. In Embodiment 2, however, the offset can be theoretically zero even if the y-direction spacing between adjacent light spots is not just zero. When the amount of lateral movement of the objective lens is u, the differential output TE1 obtained in the usual push-pull method can be expressed as follows by using the equation (13), as in Embodiment 1:

$$TE\mathbf{1}=A1\cdot\sin(2\pi\cdot v_0/q)+B1\cdot u \quad (40)$$

where B1·u is the offset component proportional to u when u is small. The offset component occurs when the light spot 48 on the photodetector 25 moves in the positive y direction. A1 is the amplitude of the track crossing component.

The differential output TE2 in the push-pull method obtained from a beam having halves 180 degrees out of phase under the same condition can be given by using the equation (31), as follows:

$$TE\mathbf{2}=-A2\cdot\sin(2\pi\cdot(v_0+e)/q)+B2\cdot u \quad (41)$$

where e is the normalized y-direction distance between the light spots 41 and 42.

B2·u is the offset component proportional to u when u is small. The offset component occurs when the light spot 49 on the photodetector 28 moves in the positive y direction. The track crossing component of TE2 is 180×(1+e/q) degrees out of phase with TE2 and has the amplitude A2. (The coefficient A2 has the same sign as the coefficient A1) The differential output TE3 in the push-pull method obtained from another beam having halves 180 degrees out of phase can be given by the equation (31), as follows:

$$TE\mathbf{3}=-A3\cdot\sin(2\pi\cdot(v_0-e)/q)+B3\cdot u \quad (42)$$

where B3·u is an offset component proportional to u when u is small. The offset component occurs when the light spot 50 on the photodetector 45 moves in the positive y direction. The track crossing component of TE3 is 180×(1−e/q) degrees out of phase with TE1 and has the amplitude A3. (The coefficient A3 has the same sign as the coefficient A1.)

When the gains G1 and G2 of the variable-gain amplifiers 52 and 53 are so set that the ratio G2/G1 between the gains G1 and G2 equals the ratio A2/A3 between the amplitude A2 of the track crossing component of the differential output TE2 and the amplitude A3 of the track crossing component of differential output TE3, the addition yields the following:

$$\begin{aligned}TE' &= G1 \cdot TE2 + G2 \cdot TE3 \\ &= G1 \cdot \{-A2 \cdot \sin(2\pi \cdot (v_0+e)/q) + B2 \cdot u\} + \\ &\quad G2 \cdot \{-A3 \cdot \sin(2\pi \cdot (v_0-e)/q) + B3 \cdot u\} \\ &= -2A2G1 \cdot \cos(2\pi e/q) \cdot \sin(2\pi v_0/q) + \\ &\quad (G1B2+G2B3) \cdot u \\ &= -2C \cdot \cos(2\pi e/q) \cdot \sin(2\pi v_0/q) + D \cdot u\end{aligned}$$

where $C=A2G1=A3G2$, $D=G1B2+G2B3$ (43)

The gains G1 and G2 of the variable-gain amplifiers 52 and 53 can be so adjusted, while maintaining the ratio G2/G1 constant, that the amplitude D of the offset component of TE' equals the amplitude B1 of the offset component of the differential output TE1 (that is, B1=D=G1B2+G2B3). Then, $$\begin{aligned}TES &= TE1 - TE' \quad (44) \\ &= A1 \cdot \sin(2\pi v_0/q) + B1 \cdot u + \\ &\quad 2C \cdot \cos(2\pi e/q) \cdot \sin(2\pi v_0/q) - D \cdot u \\ &= \{A1 + 2C \cdot \cos(2\pi e/q)\} \cdot \sin(2\pi v_0/q)\end{aligned}$$

This indicates that the offset components can be eliminated from the tracking error signal TES, irrespective of the value of e. The amplitude of the tracking error signal TES, however, varies with the magnitude of e and is maximized when the value of e/q is an integer, that is, when the y-direction spacing between adjacent light spots is just an integral multiple of the track pitch. When an optical disk tilts, it is clear that the three light spots on the photodetectors move in the same direction. Consequently, the offset components can be eliminated from the tracking error signal TES even when an optical disk tilts.

It will be described next what occurs if the phase difference between the periodic structures of the upper and lower halves of the diffraction grating deviates from 180 degrees, which is normally expected, by $180 \cdot \delta/\pi$ ($\delta$ radians) in Embodiment 2. First, the phase difference between the upper and lower halves of the plus/minus-first-order diffracted light should be found. This corresponds to a case in which the following is substituted in the equation (35):

$$X_0=\Lambda/2+\Lambda\delta/(2\pi)=(\Lambda/2)\cdot(1+\delta/\pi) \quad (45)$$

Substituting the equation (45) in the equation (36) yields the following:

$$\begin{aligned}u_{2b}(x_2) &= \exp\{i \cdot 2\pi x_2(\Lambda/2) \cdot \\ &\quad (1+\delta/\pi)/(\lambda L)\} \cdot u_{2a}(x_2) \\ &= \exp(i \cdot \pi x_2 \Lambda/(\lambda L)) \cdot \\ &\quad \exp(i\pi x_2 \delta \Lambda/(\pi\lambda L)) \cdot u_{2a}(x_2)\end{aligned} \quad (46)$$

Substituting $x_2=\pm L\cdot(\lambda/\Lambda)$ in the equation given above yields the following:

$$\begin{aligned}u_{2b}(\pm L \cdot (\lambda/\Lambda)) &= \exp(\pm i\pi) \cdot \exp(\pm i\pi\delta/\pi) \cdot u_{2a}(\pm L \cdot (\lambda/\Lambda)) \quad (47) \\ &= \exp(\pm i\pi(1+\delta/\pi)) \cdot u_{2a}(\pm L \cdot (\lambda/\Lambda))\end{aligned}$$

The equation (47) indicates that the first-order diffracted light is given a phase difference of $(\pi+\delta)$ radians and that the minus-first-order diffracted light is given a phase difference of $-(\pi+\delta)$ radians.

TE2 will be determined next. TE2 is a signal obtained from the first-order diffracted light generated by the diffraction grating 39. Adding a phase difference of $(\pi+\delta)$ radians to the first-order diffracted light is equivalent to adding $\delta/(4\pi)$ to 0.25 in the equation (15). This yields the following:

$$W_{inv}(x, y)=0.25+\delta/(4\pi) \text{ (when } y>0)$$
$$W_{inv}(x, y)=-0.25-\delta/(4\pi) \text{ (when } y<0) \quad (48)$$

By calculating the equations (16) to (31) beginning with the equation (48), the track crossing component TE2t in TE2 can be obtained as follows:

$$TE2t = K_1|R_0|^2 \cdot 4\alpha_1 \sin\psi_1 \cdot [-\sin(2\pi \cdot v_0/q - \delta)] \quad (49)$$

TE3 will then be determined. TE3 is a signal obtained from the minus-first-order diffracted light generated by the diffraction grating 39. Adding a phase difference of $-(\pi+\delta)$ radians to the phase difference between the upper and lower halves is equivalent to using the equation (50) instead of the equation (15).

$$W_{inv}(x, y)=-0.25-\delta/(4\pi) \text{ (when } y>0)$$
$$W_{inv}(x, y)=0.25+\delta/(4\pi) \text{ (when } y<0) \quad (50)$$

By calculating the equations (16) to (31) beginning with the equation (50), the track crossing component TE3t in TE3 can be obtained as follows:

$$TE3t = K_1|R_0|^2 \cdot 4\alpha_1 \sin\psi_1 \cdot [-\sin(2\pi \cdot v_0/q + \delta)] \quad (51)$$

Consequently, when the gains G1 and G2 of the variable-gain amplifiers 52 and 53 are so set that the ratio G2/G1 between the gains G1 and G2 equals the ratio A2/A3 between the amplitude A2 of the track crossing component of the differential output TE2 and the amplitude A3 of the track crossing component of differential output TE3, the addition yields the signal TE' having a track crossing component proportional to $-\cos\delta \cdot \sin(2\pi \cdot v_0/q)$. Regardless of the $\delta$ value, no offset occurs in the signal TE'. The amplitude of the signal TE', however, decreases in proportion to the cosine of $\delta$. Since TE1 is originally not related to $\delta$, the tracking error signal TES, which is obtained from the difference between TE' and TE1 multiplied by G1, has no offset.

The advantages of Embodiment 2 include the advantages of Embodiment 1 described earlier and the relaxed requirements of the positioning accuracy of the light spots on the information recording medium and the accuracy of the phase difference given by the phase difference addition means.

What is claimed is:

1. An optical head tracking error detection device, comprising:

means for directing and focusing two light beams onto an information recording medium to form first and second light spots;

phase difference addition means for introducing a phase difference of substantially 180 degrees between substantially-half portions of one of said two beams directed to the information recording medium;

first and second split photodetectors for respectively receiving the light beams returning from the respective light spots on the information recording medium, each of said split photo detectors having a pair of light receiving faces, and each of the light receiving faces receiving a substantially equal portion of the returning light if the light spots are focused on the information recording medium and are tracking correctly; and means for producing a tracking error signal on the basis of the difference between differential outputs of said first and second split photodetectors, wherein said directing and focusing means disposes the light spots on the information recording medium such that the light spots do not overlap and a spacing between the light spots in the direction perpendicular to tracks on the information recording medium is substantially zero.

2. The optical head tracking error detection device according to claim 1, wherein the first light spot is a round spot, and the second light spot includes a pair of elliptical sub-spots.

3. The optical head tracking error detection device according to claim 2, wherein the spacing between the first light spot and the second light spot is defined by the distance in the lateral direction of the track between the center of the first light spot and the center of the sub-spots forming the second light spot.

4. The optical head tracking error detection device according to claim 1, wherein said pair of light receiving faces in said split photo detectors are divided by a boundary which divides the received light beam into substantially equal portions if the light spots are focused on the information recording medium and are tracking correctly.

5. The optical head tracking error detection device according to claim 1, wherein said directing and focusing means includes:

a first light source for emitting a light beam of a first wavelength;

a second light source for emitting a light beam of a second wavelength different from said first wavelength; and means for merging the first and second light beams, wherein said phase difference addition means is interposed in the optical path between said second light source and said merging means.

6. The optical head tracking error detection device according to claim 5, wherein said phase difference addition means is formed as a plate of transparent material having a stepwise change in thickness along a line dividing the light beam from said second light source into said substantially-half portions.

7. The optical heading tracking error detection device according to claim 5, further comprising:

means for dividing the light beams returning from the recording medium into the light beam having the first wavelength and the light beam having the second wavelength;

wherein said first split photodetector receives the light beam of the first wavelength from said dividing means, and said second split photodetector receives the light beam of the second wavelength from said dividing means.

8. The optical head tracking error detection device according to claim 1, wherein said tracking error signal producing means includes:

a first difference detecting means for detecting the difference between the amount of light received by said pair of light receiving faces of said first split photodetector;

a second difference detecting means for detecting the difference between the amount of light received by said pair of light receiving faces of said second split photodetector;

a variable gain amplifier for amplifying the output of said second difference detecting means; and a third difference detecting means for detecting the difference between the output of said first difference detecting means and the output of said variable gain amplifier, wherein the gain of said variable gain amplifier is adjusted so that the offset component in the output of said first difference detecting means equals the offset component in the output of said variable gain amplifier.

9. An optical head tracking error detection device, comprising:

means for directing and focusing three light beams onto an information recording medium to form first, second and third light spots on the recording medium;

first, second and third split photodetectors for respectively receiving the light beams returning from the first, second and third light spots on the information recording medium, each of said split photo detectors having a pair of light receiving faces, and each of said light receiving faces receiving a substantially equal portion of the returning light if the light spots are focused on the information recording medium and are tracking correctly; and means for producing a tracking error signal on the basis of differential outputs of said first, second and third split photodetectors, wherein said directing and focusing means includes a diffraction grating having first and second sections respectively having periodic structures which are out of phase by about 180 degrees, for giving a phase difference of substantially 180 degrees to substantially-half portions of two of the three beams, and disposes the light spots on the information recording medium such that a spacing between two adjacent light spot in the direction perpendicular to tracks on the information recording medium is substantially an integral multiple of track pitch.

10. The optical head tracking error detection device according to claim 9, wherein the second and third light spots are on opposite sides of the first light spot in the direction of the track, the first light spot is a round spot, and each of the second and third light spots includes a pair of elliptical sub-spots.

11. The optical head tracking error detection device according to claim 10, wherein the spacing between the first light spot and each of the second and third light spots is defined by the distance in the lateral direction of the track between the center of the first light spot and the center of the sub-spots forming each of the second or third light spot.

12. The optical head tracking error detection device according to claim 9, wherein the spacing between the two adjacent light spots in the direction perpendicular to the tracks on the information recording medium is substantially zero.

13. The optical head tracking error detection device according to claim 9, wherein said directing and focusing means includes a light source for emitting a light beam; and said diffracting grating means divides the light beam from said light source into three light beams.

14. The optical head tracking error detection device according to claim 13, wherein said diffraction grating includes a plate of a transparent material having said first and second sections, each of said first and second sections having a periodic structure formed of an array of linear concaves and convexes adjacent to each other, and the periodic structures of the first and second parts are about 180 degrees out of phase with each other, and a boundary between said first and second sections extends to divide the light beam into substantially-half portions.

15. The optical head tracking error detection device according to claim 9, wherein said tracking error signal producing means includes:

a first difference detecting means for detecting the difference between the amount of light received by said pair of light receiving faces of said first split photodetector;

a second difference detecting means for detecting the difference between the amount of light received by said pair of light receiving faces of said second split photodetector;

a third difference detecting means for detecting the difference between the amount of light received by said pair of light receiving faces of said third split photodetector;

a first variable gain amplifier for amplifying the output of said second difference detecting means;

a second variable gain amplifier for amplifying the output of said third difference detecting means; and a third difference detecting means for detecting the difference between the output of said first difference detecting means and the sum of the outputs of said first and second variable gain amplifiers;

wherein the gains of said first and second variable gain amplifiers are adjusted so that the ratio of the gain of said second variable gain amplifier to the gain of said first variable gain amplifier equals the ratio of an amplitude of a track crossing component of an output of said second difference detecting means to an amplitude of a track crossing component of an output of said third difference detecting means, and an amplitude of an offset component of a sum of the output of said first variable gain amplifier and the output of said second variable gain amplifier equals an amplitude of an offset component of the output of said first difference detecting means.

16. The optical head tracking error detection device according to claim 9, wherein said pair of light receiving faces in said split photo detectors are divided by a boundary which divides the received light beam into substantially equal portions if the light spots are focused on the information recording medium and are tracking correctly.

* * * * *